(12) United States Patent
Miloslavsky et al.

(10) Patent No.: US 8,522,195 B2
(45) Date of Patent: Aug. 27, 2013

(54) SYSTEMS AND METHODS TO GENERATE A SOFTWARE FRAMEWORK BASED ON SEMANTIC MODELING AND BUSINESS RULES

(75) Inventors: Alec Miloslavsky, Burlingame, CA (US); Oleg Bondarenko, San Francisco, CA (US); Sandeep Singh, Saint John (CA)

(73) Assignee: Exigen Properties, Inc., Tortola (VG)

( * ) Notice: Subject to any disclaimer, the term of this patent is extended or adjusted under 35 U.S.C. 154(b) by 1180 days.

(21) Appl. No.: 12/203,887

(22) Filed: Sep. 3, 2008

(65) Prior Publication Data
US 2009/0077531 A1  Mar. 19, 2009

Related U.S. Application Data

(60) Provisional application No. 60/972,662, filed on Sep. 14, 2007.

(51) Int. Cl.
*G06F 9/44* (2006.01)
*G06F 9/45* (2006.01)

(52) U.S. Cl.
USPC .......................... 717/104; 717/107; 717/108

(58) Field of Classification Search
USPC .......................... 717/104–113, 116, 120–122
See application file for complete search history.

(56) References Cited

U.S. PATENT DOCUMENTS

| | | | |
|---|---|---|---|
| 6,199,195 B1 * | 3/2001 | Goodwin et al. | 717/104 |
| 6,266,805 B1 * | 7/2001 | Nwana et al. | 717/104 |
| 7,200,563 B1 * | 4/2007 | Hammitt et al. | 705/7.11 |
| 7,240,330 B2 * | 7/2007 | Fairweather | 717/116 |
| 7,424,701 B2 * | 9/2008 | Kendall et al. | 717/105 |
| 7,567,915 B2 * | 7/2009 | Hammitt et al. | 705/7.11 |
| 7,636,911 B2 * | 12/2009 | Kristoffersen et al. | 717/108 |
| 7,673,282 B2 * | 3/2010 | Amaru et al. | 717/104 |
| 7,711,670 B2 * | 5/2010 | Roediger | 706/46 |
| 7,747,980 B2 * | 6/2010 | Illowsky et al. | 717/107 |
| 7,774,751 B2 * | 8/2010 | Zhuk | 717/120 |
| 7,779,383 B2 * | 8/2010 | Bornhoevd et al. | 717/104 |
| 7,877,726 B2 * | 1/2011 | Sabbouh | 717/106 |
| 7,890,484 B1 * | 2/2011 | Hall | 707/705 |
| 7,895,241 B2 * | 2/2011 | Schoen et al. | 707/802 |
| 7,895,568 B1 * | 2/2011 | Goodwin et al. | 717/108 |

(Continued)

FOREIGN PATENT DOCUMENTS

KR  100729103 B1  6/2007

OTHER PUBLICATIONS

Zhou et al, "An ontology based approach to reengineering enterprise software for cloud computing", IEEE, pp. 383-388, 2010.*

Nejad et al, "Managing requirement volatility in an ontology driven clinical LIMS using category Theory", International Jour. of Telemedicine and Appl. article ID 917826, pp. 1-14, 2009.*

(Continued)

*Primary Examiner* — Anil Khatri
(74) *Attorney, Agent, or Firm* — Greenberg Traurig, LLP

(57) ABSTRACT

A software framework based on semantic modeling and business rules, in which a method implemented in a data processing system, includes: receiving input from one or more first users to generate a first ontology describing a software requirement; and receiving input from one or more second users to map the first ontology to a second ontology describing software tools. The data processing system generates a software framework using the input that is received to map the first ontology that describes the software requirement to the second ontology that describes the software tools.

18 Claims, 9 Drawing Sheets

(56) References Cited

U.S. PATENT DOCUMENTS

| | | | |
|---|---|---|---|
| 7,926,029 B1 * | 4/2011 | Stoyen et al. | 717/117 |
| 7,926,031 B2 * | 4/2011 | Faihe et al. | 717/121 |
| 8,065,655 B1 * | 11/2011 | Deo et al. | 717/106 |
| 8,086,994 B2 * | 12/2011 | O'Connell et al. | 717/104 |
| 8,201,139 B2 * | 6/2012 | Chang et al. | 717/104 |
| 8,250,521 B2 * | 8/2012 | Zhang et al. | 717/104 |
| 2003/0177112 A1 | 9/2003 | Gardner | |
| 2007/0130561 A1 | 6/2007 | Siddaramappa | |

OTHER PUBLICATIONS

Maedche et al, "Managing multiple and distributed ontologies on the semantic web", The VLDB Journal, 12: pp. 286-302, 2003.*

Marinho et al, "An ontology based software framework to provide educational data mining", ACM SAC, pp. 1433-1437, 2010.*

International Application No. PCT/US2008/075241, Written Opinion and International Search Report, Mar. 25, 2009.

* cited by examiner

SYSTEMS AND METHODS TO GENERATE A SOFTWARE FRAMEWORK BASED ON SEMANTIC MODELING AND BUSINESS RULES

RELATED APPLICATIONS

The present application claims priority to a provisional U.S. Patent Application Ser. No. 60/972,662, filed Sep. 14, 2007, entitled "System and Method for using Semantic Modeling and Business Rules to Generate a Software Framework", the disclosure of which is hereby incorporated herein by reference.

BACKGROUND

In today's world of business software development, a business idea goes through a large number of hands during its development, before the idea becomes an implemented software product. The development may involve business people, analyst, system architect, and programmers. First, the business people who want the product write a requirement from business perspective; then the analyst tries to convert the requirement from business perspective to IT (information technology) perspective. Then the system architect tries to convert the IT requirements into detailed requirements in view of an actual available system, and the programmers try to write code and implement the idea.

Each transfer of the idea from one party to another tends to introduce errors and distortions of the original requirements.

SUMMARY OF THE DESCRIPTION

Systems and methods are provided to generate a Software Framework based on Semantic Modeling and Business Rules. Some embodiments are summarized in this section.

In one embodiment, a method implemented in a data processing system, includes: receiving input from one or more first users to generate a first ontology describing a software requirement; receiving input from one or more second users to map the first ontology to a second ontology describing software tools; and generating a software framework in the data processing system based on the input received from the one or more second users to map the first ontology to the second ontology.

In one embodiment, the software tools include existing software tools. The first ontology includes uses cases, processes and rules for a requested software system; and the second ontology includes uses cases and rules of existing tools or new tools.

In one embodiment, the data processing system receives input to partition the software tools to generate the second ontology. An ontology can be provided to assist partitioning of the software tools.

In one embodiment, the software requirement is related to a business; and the software framework includes at least a business object model, a business rules model, or a business process model.

In one embodiment, a semantic collaborative web site is used to receive the input from the one or more first users to define a specification of the requested software system. Semantic extraction and mapping is performed to generate articles and a domain ontology for the semantic collaborative web site. The semantic extraction and mapping is may be performed using an ontology-based information extraction (OBIE) technique, such as General Architecture for Text Engineering (GATE). In one embodiment, a third ontology is stored to aid the semantic extraction.

In one embodiment, an integrated issue tracking system is provided to facilitate the collaboration among the users.

In one embodiment, an expertise management system to route a document or inquiry is provided to facilitate the collaboration among the users. The expertise management system includes semantic rules for query, monitoring, expertise mapping, ranking, allocation, user interaction management.

In one embodiment, a rule-based reasoner is used to validate the input from the one or more first users. The users are prompted for interactive user involvement to resolve rule violations detected by the rule-based reasoner.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least one embodiment of the invention provides a system and method that reduces errors and distortions caused by transfers between persons by entering the plan for an application directly into a software tool that can process the requirements. In one embodiment, the system and method captures the specification of the application into an environment that can be used directly to model, and potentially generate, a system.

Figure 1:
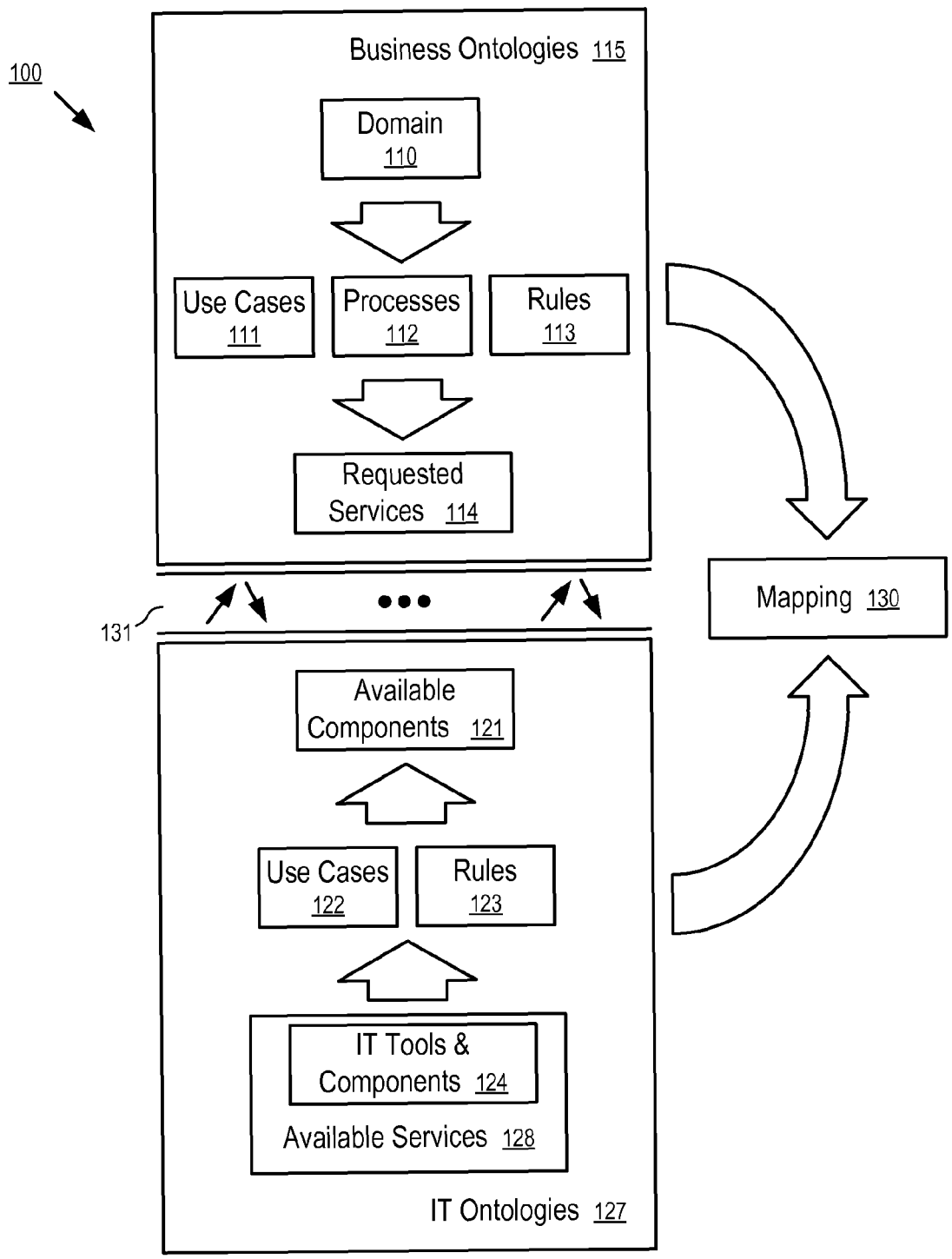
FIG. 1 shows an overview of a system to generate a software frame according to one embodiment.

FIG. 1 shows an overview of a system 100 to generate a software frame according to one embodiment.

In current art, a system analyst would come in and talk to the business people, then write a specification. Then a system architect would come in and partition the specification, and then software people would try to implement the software (now after at least three handovers).

By contrast, according to the novel art of this disclosure, the system 100 as illustrated in FIG. 1 has a business section, wherein the business people mostly work and provide information and knowledge (structured information) to generate business ontologies 115, and an IT section, where the system architects and software people provide information and knowledge to generate IT ontologies 127, and a mapping tool 130 in a tie-in section, where the system analysts map "needs" (requests generated out of the business knowledge) to "services" (services provided based on the existing and new IT infrastructure).

In one embodiment, an ontology is a data representation or model of a system. The ontology may define the elements within a system and relations between them to specify "what exists" in the system.

In FIG. 1, domain-specific knowledge 110 is structured by adding use cases 111 (e.g., examples), describing processes 112 (e.g., as flow charts), and creating a comprehensive rules set 113, specific to the domain or even the company itself. The domain-specific knowledge 110, use cases 111, processes 112 and rules 113 jointly form a specification of the business case. Out of these rules and constraints, applied through the subsets of domain-specific knowledge 110, e.g., use cases 111, processes 112, and rules set 113, a description for a set of needed or requested services 114 is created.

In FIG. 1, available services 128, such as business process model (BPM), user interface (UI), business object model (BOM), and legacy systems, are broken out into IT tools and components 124. In one embodiment, some of the IT tools and components 124 are new components added for this project, while some of the IT tools and components 124 are available existing services which may have been used in other projects. The knowledge about the IT tools and components 124 can be structured by adding use cases 122 and rules (123). The IT knowledge 124, use cases 122, and rules 123 jointly form a specification of available resources. Out of these rules and constraints, applied through the subsets of IT knowledge 124, e.g., use cases 111, and rules set 113, a description for a set of available components 121.

In FIG. 1, the mapping performed via the mapping tool 130 in the tie-in section generates the connections 131 between the requested services 114 in the business section and the available components 121 in the IT section. The mapping is done typically at a later stage, and can be modified when the required services 114 are changed. The business section contains the Business Ontologies (BO) 115 to describe the needs for services 114 based on a specific business model. A system architect then uses mapping tool 130 to map the services onto service components 121 that are a subset of the IT ontologies 127 in the IT side.

In some cases, there may be a mismatch after the mapping, requiring the IT side to add new services, or in other cases, the business side may need to change some requirements to match up the system, to avoid costly changes on the IT side. In one embodiment, the system provides design-time constraint-based validation, therefore minimizing costly errors that may appear during system implementation, testing, deployment and exploitation.

Typically, the implementation would capture this knowledge about a desired application in a standard set of formats (i.e., BPM, BOM) that are XML-based and thus allow easy interchange with other entities that are web based, such as internal software, external systems, etc. That approach allows further re-use of the existing body of work that uses a similar foundation to model various useful data schemas, messaging standards, etc.

Figure 2:
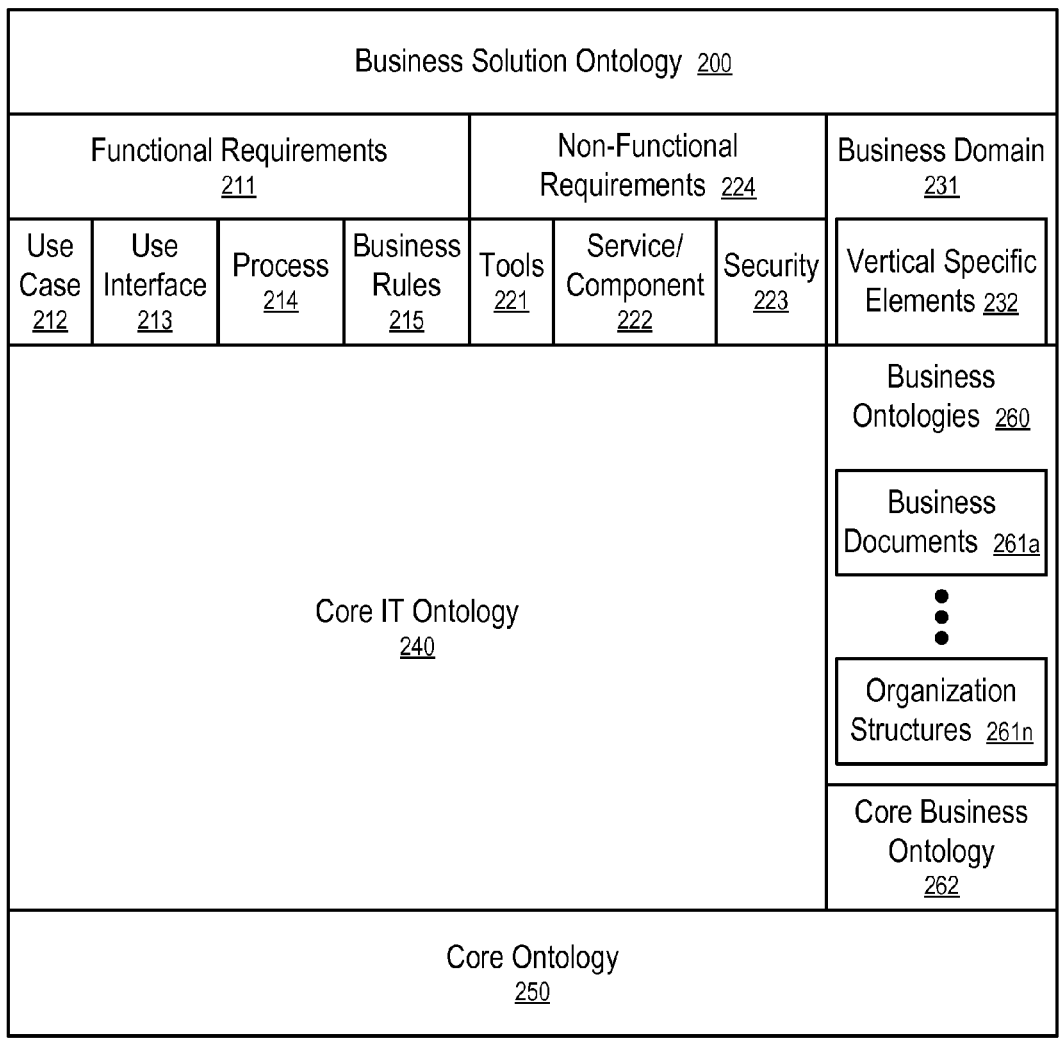
FIG. 2 shows an ontology structure according to one embodiment.

FIG. 2 shows an ontology structure according to one embodiment. FIG. 2 provides a more detailed view of the business ontologies 115 that are in the business section of FIG. 1.

The ontology structure as illustrated in FIG. 2 has several subsections, including, for example, business domain 231, containing the business domain approach, and one or more business vertical-specific elements 232.

Beneath business domain 231 are business ontologies 260 containing the business documents 261a, organizational structure documents 261n, and others, such as process documents.

Underneath the business ontologies 260 is a core business ontology 262, which is used to organize the business ontology 260.

Core ontology 250 underlies the system; while core IT ontology 240, which represents portions of IT section, underlies the functional requirements 211 and nonfunctional requirements 224.

Functional requirements 211 include use cases 212 (e.g., examples of how this system is used), user interface (UI) 213 (e.g., screens, dialogs, messages, etc.), process 214 (e.g., the process that occurs for a transaction), and business rules 215 (e.g., the rules according to which the process 214 is to proceed).

Nonfunctional requirements 224 include tools 221, services and components 222, and security aspects 223. Other non-functional requirement ontology may include elements of performance, scalability, reliability, concurrency, localization/internationalization, usability, extensibility, customization and maintainability.

The business solution ontology 200 is based on the business ontologies and the IT ontologies. Business solution ontology may include and extend one or more business vertical and business horizontal ontologies. Examples of business horizontal ontologies include: order management, billing, case management, accounting, intellectual property management, etc. Examples of business vertical ontologies include: insurance, telecom, banking, financial, real estate, etc.

Figure 3:
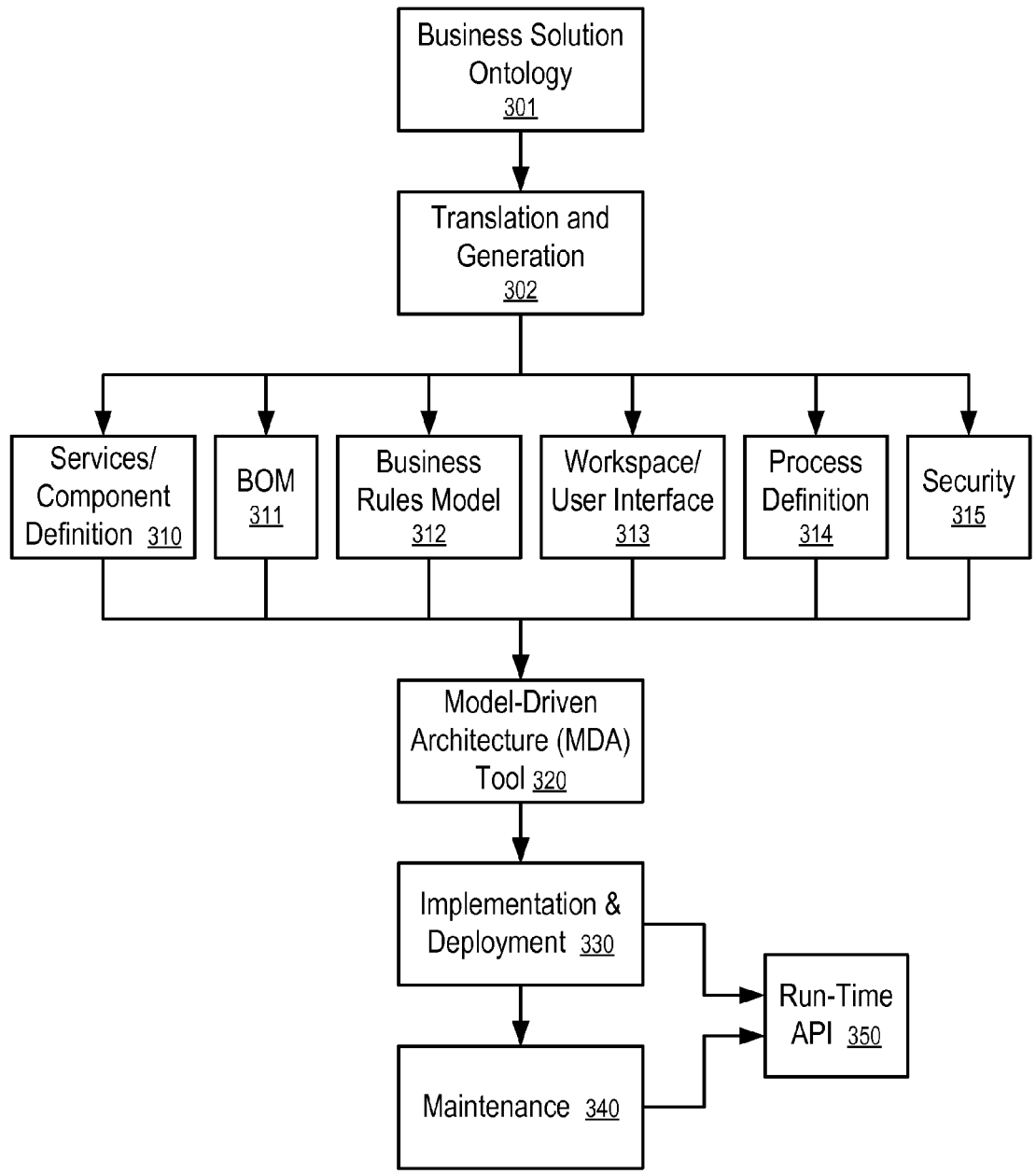
FIGS. 3-5 illustrate a process to generate a software system according to one embodiment.

FIG. 3 illustrates a process to generate a software system according to one embodiment. A business solution ontology 301 is generated and presented for processing, which includes translation and generation 302. The business solution ontology is translated and services and components are generated. The generated services and components 310-315 may include definitions 310, Business Object Model (BOM) 311, business rules model 312, workspace/UI 313, process definition 314, and security 315.

In one embodiment, the generation of the services and components 310-315 from the business solution ontology 301 includes the mapping or stitching performed using the mapping tool 130 in FIG. 1 to generate the connections 131 between the required services 114 in the business section and available components 121 in the IT section.

In FIG. 3, a model-driven architecture (MDA) tool 320 is used to generate an MDA out of the generated services and components 310-315. Based on the MDA, the system implementation and deployment 330 take place. Further derivatives may be used for maintenance 340 and support of the system, and a run-time API (350) that can support the MDA can be generated.

Figure 4:
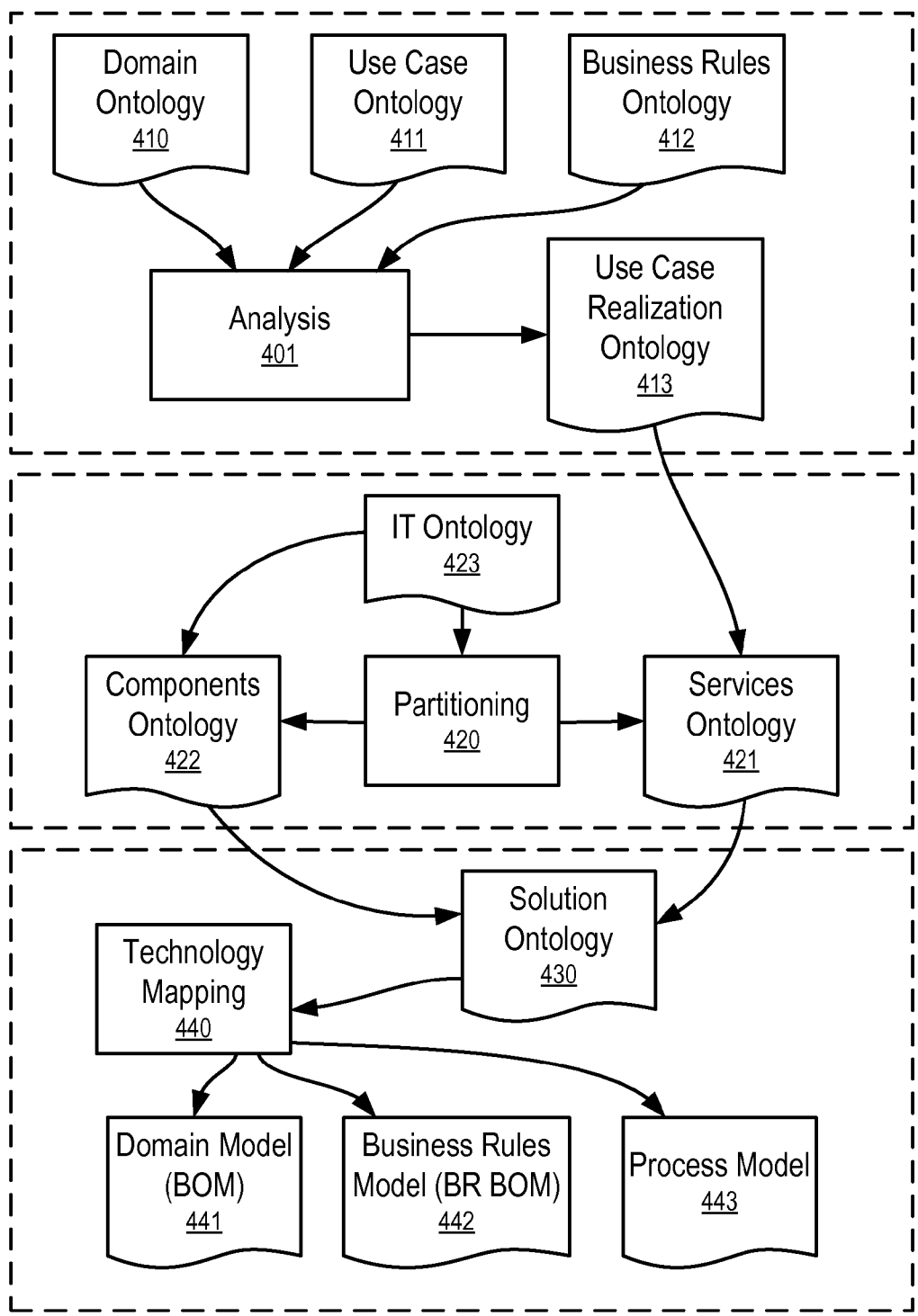

FIG. 4 shows another view of the generation process. In FIG. 4, an analysis (401) of the domain ontology 410 (which is industry-specific and may include and extend one or more vertical and horizontal ontologies.), the use-case ontology 411, and the rules ontology 412 of applicable business rules (e.g., legal rules, business rules, profitability rules, etc.) is performed to create a use case realization ontology 413.

In one embodiment, a generated ontology can be presented as an ontology document, for example, a Web Ontology Language (OWL) document.

In FIG. 4, the use case realization ontology 413 is partitioned into service ontology 421, corresponding to the requested services 114 in FIG. 1; and the IT ontology 423 is partitioned 420 into component ontology 422, corresponding to the available services 121 in FIG. 1. This example is well suited for service oriented architecture. In other types architecture the same logic can also be used to map to that architecture specific artifacts.

From component ontology 422 and service ontology 421, solution ontology 430 is created, which is mapped onto the existing underlying model. This mapping corresponds to the mapping tool 130 and connections 131 in FIG. 1. The results of the technology mapping 444 are domain BOMs 441, the rules BOMs 442, and business process models (BPMs) 443.

Because the specifications are captured as formal ontologies and semantic meanings, management and reporting is possible for activities such as figuring out the semantic differences between versions (not just the differences but the actual meaning of the differences), inferring unspecified relationships and meanings, and generating human-readable specifications from the underlying ontology and semantic models (for documentation and verification). It is clear that many additional benefits may be derived from the embedding of semantics into the specification, as opposed to just a technical specification (without embedded semantics).

Figure 5:
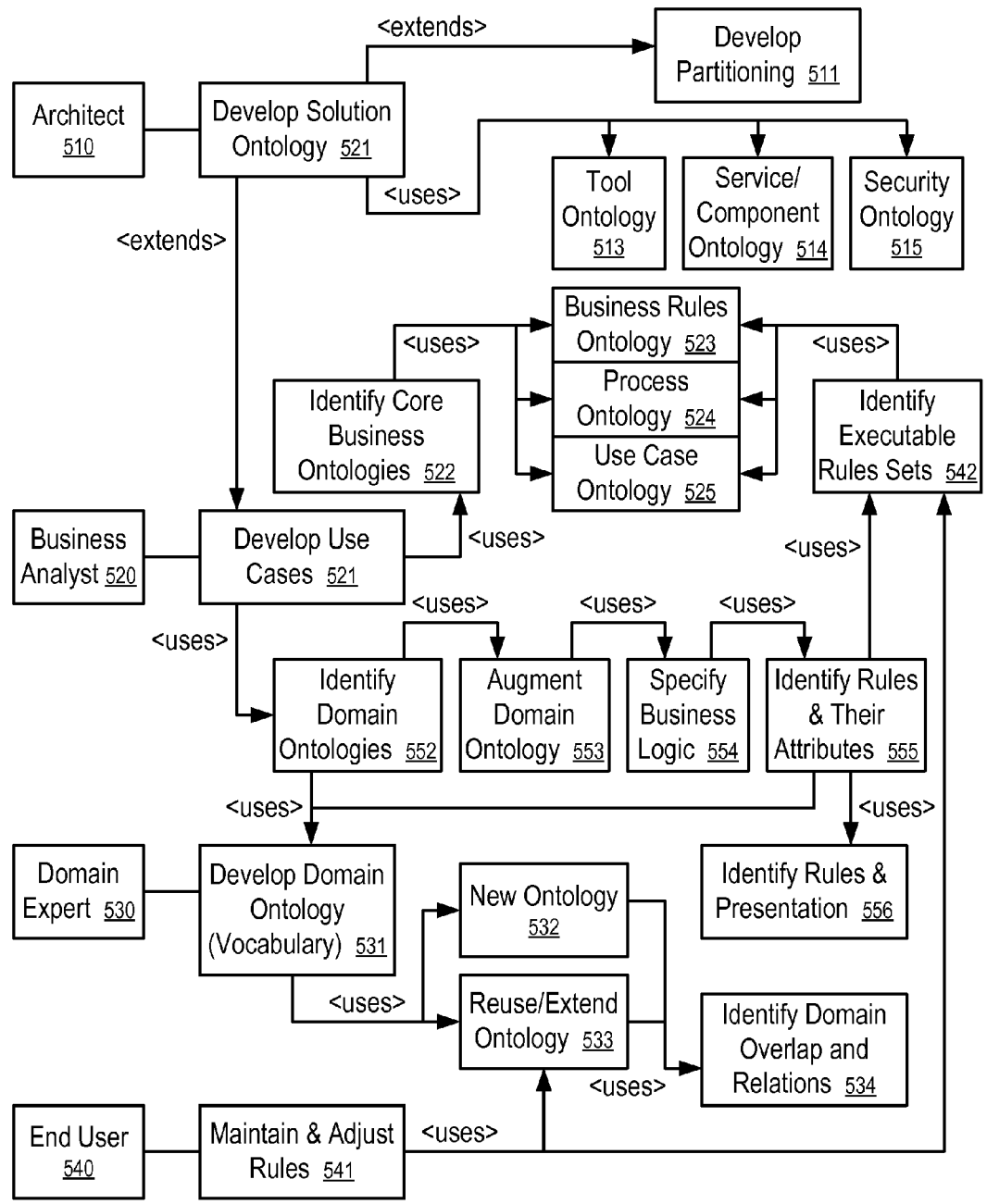

FIG. 5 is a user-level view of the development process shown in FIG. 4. It shows activities in which users are involved during the development process, thus helping to clarify the methodology with respect to user activities.

Users use various tools to help make each activity productive. Tools provide a user interface (UI) tuned to the profiles and skills of various users.

Domain expert 530 may start defining domain (or enterprise) vocabulary 531, where it would either create new ontology 532 or reuse and/or extend existing ontology 533, which could be either a vertical or an enterprise ontology available from some ontology repository.

Typically the development process would require involvement of several domain experts resulting in several domain ontologies, representing users' expertise, which typically would overlap with respect to terms and semantics. An overlap between domains, and relationships between vocabulary entries can be identified 534, either automatically or with the involvement of an architect (or IT specialist), with subsequent application of resolution techniques.

Domain ontologies are used as an input to business analyst 520 during use case development 521, to identify 552 domain ontologies 552 and identify 555 reusable business rules for an implementation.

The business analyst 520 may augment 553 domain ontology and specify 554 business logic for the particular application. Business analyst 520 works with architect 510 (e.g., IT specialist, data modeler) on technical aspects of solution ontology development 512. This development process involves identifying 522 core business ontologies, which may include business rules ontology 523, process ontology 524 and use case ontology 525. For each of the business ontologies 523-525, an executable rules set is identified 542, which allows associating executable business rules with business processes (guarding and constraining state transitions, activities, etc.), defining behavior within a use case with respect to manual (involving users aided by UI tools) and automated (involving utilities) activities.

Architect 510 is responsible for developing 512 solution ontology, which involves usage of predefined (within specific technology) tools 513, services and components 514, security 515, and possibly other IT ontologies, covering various aspects of the system. The architect 510 is responsible for describing how tools should be applied to satisfy non-functional requirements of the system (i.e., performance, scalability, security, etc.). The architect 510 also develops 511 partitioning, which determines how the system should be divided into components, which allows grouping of various services with respect to one or more use cases identified during the requirements elaboration phase.

The approach of the novel art of this disclosure helps to standardize and streamline not only specification-gathering but also the architecture of the system. Because the underlying system design is the artifact of an effort by an experienced architect assigning various functions to various tools in the IT ontology module (and specifying how they are to be interconnected), the tools themselves can be abstracted as an ontology and semantic meanings (see FIGS. 1 and 2 above). That approach embeds and captures the main architect's knowledge and experience in how to use such tools in a series of use cases. Hence the architect that does the actual implementation, as described in FIG. 5, does not need to be as skillful, as his use of the IT ontology already has the main architect's skill embedded in it, thus making the process of system architecture possible with a lesser skill.

A Wiki (derived from the Hawaiian word Wiki Wiki, meaning quick) is a collaborative web site that comprises the perpetual collective work of many authors. A Wiki allows anyone to edit, delete or modify content that has been placed on the web site, site using a browser interface, including the work of previous authors. The term Wiki refers to either the web site or the software used to create the site. A semantic Wiki is a Wiki that has an underlying model of the knowledge described in its pages.

Figure 6:
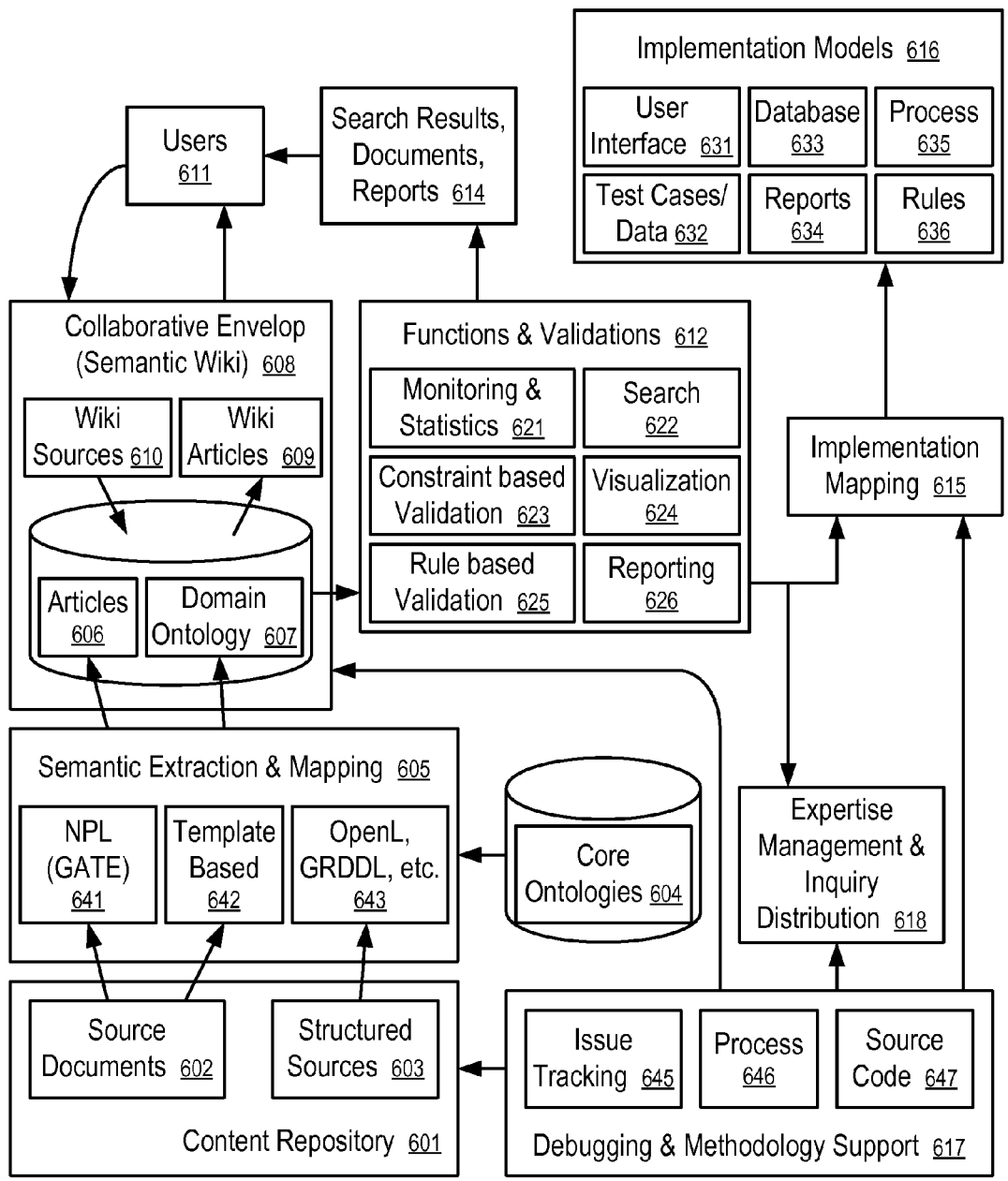
FIG. 6 shows an exemplary system for business domain ontology development with semantic Wiki and methodology support, according to one embodiment.

FIG. 6 shows an exemplary system 600 for business domain ontology development with semantic Wiki and methodology support, according to one embodiment. In content repository 601 of FIG. 6, source data is obtained from documents 602, such as office documents, web portals (web crawlers), etc., and/or from structured sources 603 that use existing standards (e.g., XML, XHTML) or represent source code and other implementation artifacts (e.g. configuration files, database schema, etc.) of software components as well as Wiki sources 610.

In FIG. 6, data is transformed by means of semantic extraction and mapping tools 605. Ontologies 604 are used in the process to aid extraction. Ontology learning (or acquisition) is a subtask of the information extraction process for the purpose of extracting concepts and relations from a given corpus. It may use linguistic processors (e.g., part of speech tagging, phrase chunking, etc.) to extract concepts and relations, aided by statistical or neural network techniques to extract relationship signatures.

A number of successful ontology-based information extraction (OBIE) techniques have recently been employed, some of which are based on a general architecture for text engineering (GATE) tool 641. As oppose to term extraction, OBIE tries to determine classifications, hierarchies and relationships, and OBIE may employ the following approaches: hidden Markov models (HMM), conditional random fields (CRF), maximum entropy models, etc. The support vector machines (SVM) approach was successful in this area as well.

The semantic extraction and mapping tools 605 may be template based 642, rule-based, using domain specific language frameworks (e.g. OpenL) and/or standard formats such as Gleaning Resource Descriptions from Dialects of Languages (GRDDL) 643.

In FIG. 6, the resulting data generated from the semantic extraction and mapping tools 605 populates article database 606 and domain ontology database 607, which lie within collaborative envelope 608. Source document mapping information and mapping rules are preserved in database 607 and also for further use in expertise management 618 and its associated storage (not shown in FIG. 6) for future reference.

Business domain analysis information can be presented as Wiki articles 609 and can be further edited directly by users 611, using the Wiki user interface (not shown in FIG. 6) to feed Wiki sources 610. In some cases, other Wiki sources may also be linked, such as relevant public Wiki forums, etc.

In one embodiment, changes made either using the Wiki user interface or directly imported from documents (e.g., from repository 601 via semantic extraction and mapping 605) are validated using semantic function and validation services 612, such as rule-based reasoners (e.g., OpenL Tablets rules, Description Logic, etc.), prompting interactive user involvement with problem resolution in case of rule and constraint violations found before changes become "publicly available" to non-creating other users.

The extensive use of Wiki allows preservation of a history of all changes and allows reversion to previous versions, in which case another pass through the validation process is required. Wiki 608 allows the users 611 to submit queries and obtain search results, documents and reports 614, based on articles, Wiki sources and ontologies.

Validated ontologies can be used to construct implementation mapping rules 615, which could vary for different architectures. Various implementation models (artifacts) 616 can be produced, covering the user interface 631, test cases and test data 632, database 633, reports 634, process 635, rules 636 and others, such as static model.

During a typical development cycle various issues may arise that need to be handled collaboratively by multiple users at various stages of business domain ontology development, which can be processed via a debugging and methodology support module 617. Collaboration within this unit is facilitated by an integrated issue tracking system, such as Bugzilla, TrackIt, etc., that allow a customized issue handling process to suit the concrete methodology.

Inquiry and document routing is aided by an expertise management module 618, which ensures that relevant information about inquiries, articles and documents is delivered to interested parties. It also tracks what changes are made by whom, thus allowing a volumetric expertise metering of people involved in the process.

In one embodiment, expertise management is a component that facilitates expertise sharing and dissemination and is an ingredient of knowledge management. Such techniques can be used for developing best practices, making sure that the most successful methods (of, e.g., software development) become widely known and learned throughout the organization. Techniques in this area should employ various levels of measurement: nominal, ordinal, interval and ratio. Such measurements are further filtered and aggregated by period of time, domain, topic, article, user, group of users, etc. The component is also aware of the knowledge management life cycle. Life cycle events of knowledge management can provide insight into the quality, effectiveness, and timeliness of user contributions, thus allowing determination of the value of such contributions, further extracting most effective knowledge patterns, and allocating best experts for the tasks.

Figure 7:
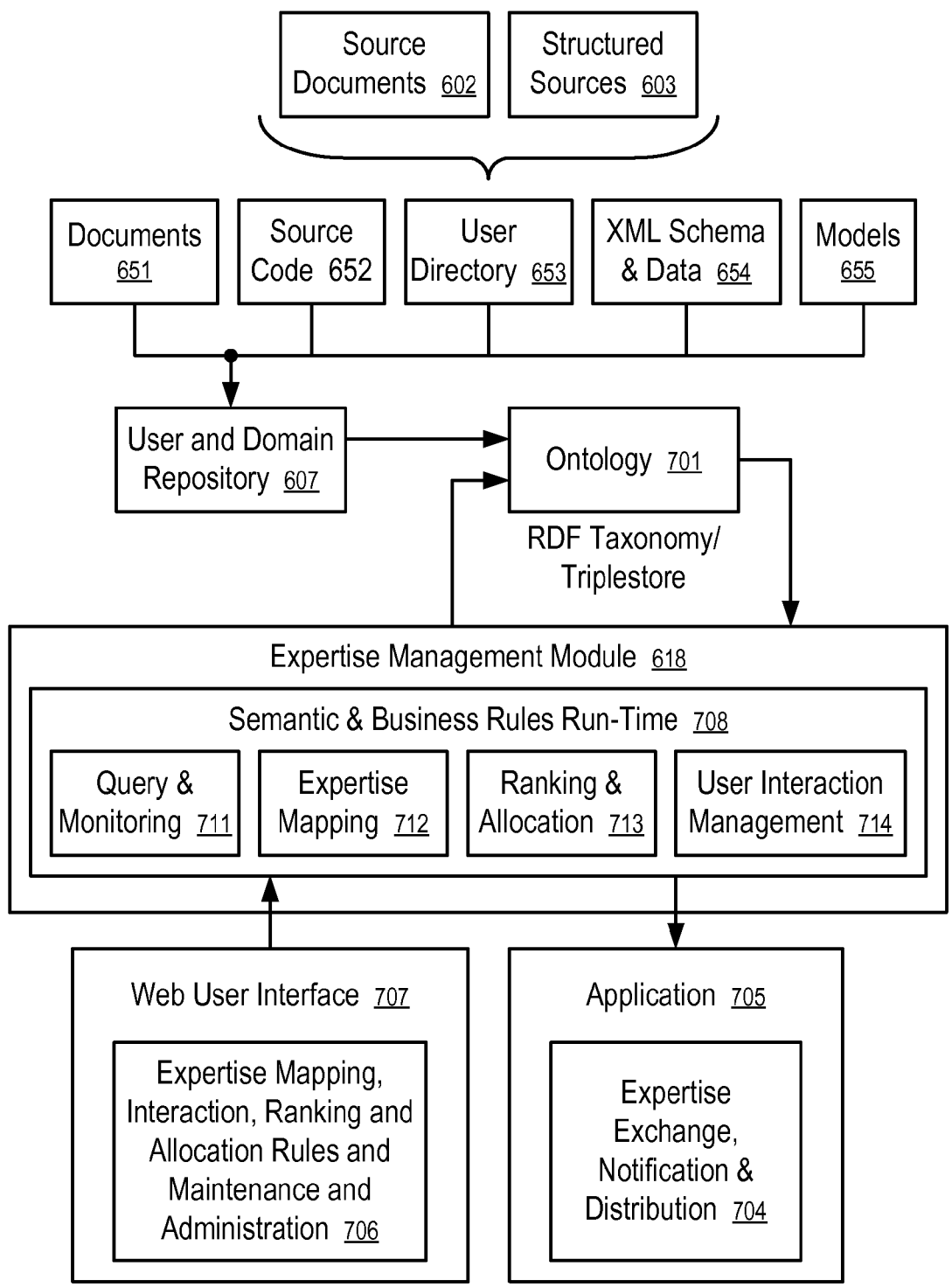
FIG. 7 shows an exemplary system for expertise management and inquiry distribution according to one embodiment.

FIG. 7 shows an exemplary system for expertise management and inquiry distribution according to a preferred embodiment, which provides a closer view of the general neighborhood of expertise module 618 of FIG. 6.

In FIG. 7, information is collected from multiple sources, such as source documents 602 and structured sources 603, processed and deposited in the form of core ontologies 607 into a knowledge base, as described in the discussion of FIG. 6.

Document content may include office documents 651, source code 652, user directory 653, XML schema and data 654, models 655 and others such as messages, blog posts, Wiki articles, etc., stored in the user and domain repository 607.

As part of the information extraction process, information about enterprise users is extracted and associated with information they contribute to the system to generate ontology 701. The information is also integrated with data that may reside in the issue tracking system. Knowledge base content is further processed through expertise management module (EMM) 618, which comprises of a set of queries and statistics, managed by query and monitoring module 711 of semantic and business rules run-time 708.

Using rules, the semantic and business rules run-time 708 can map expertise 712, calculate rankings, allocate inquiries, and distribute notifications. User ranking and expertise allocation 713 is propagated back to knowledge base ontology 701 to form part of user profile. Through various user interaction management means 714, including Wiki, blog and various communication channels, users may submit inquiries to the expertise management module 618, and results, may be delivered to applications 705 for expertise exchange, notification and distribution 704.

Applications 705 would facilitate knowledge sharing and access to expertise. Examples of such applications could be "an expertise router," which would allow finding and allocating the best expert for the task or injury, for example in a corporate environment, where for example field people or customer, or other processes may need access to expertise, and their requests may be routed to the most suitable person or entity by expertise management module (EMM) 618, or in other cases wrap access to EMM 618 in various "solution helpers" or "wizards", which would automatically suggest relevant (popular) knowledge patterns to individuals or teams working on a task or project, etc.

Through a web interface 707, expertise mapping, interaction, ranking and allocation rules maintenance and administration 706 is performed, using tools such as OpenL Web Studio, etc.

Figure 8:
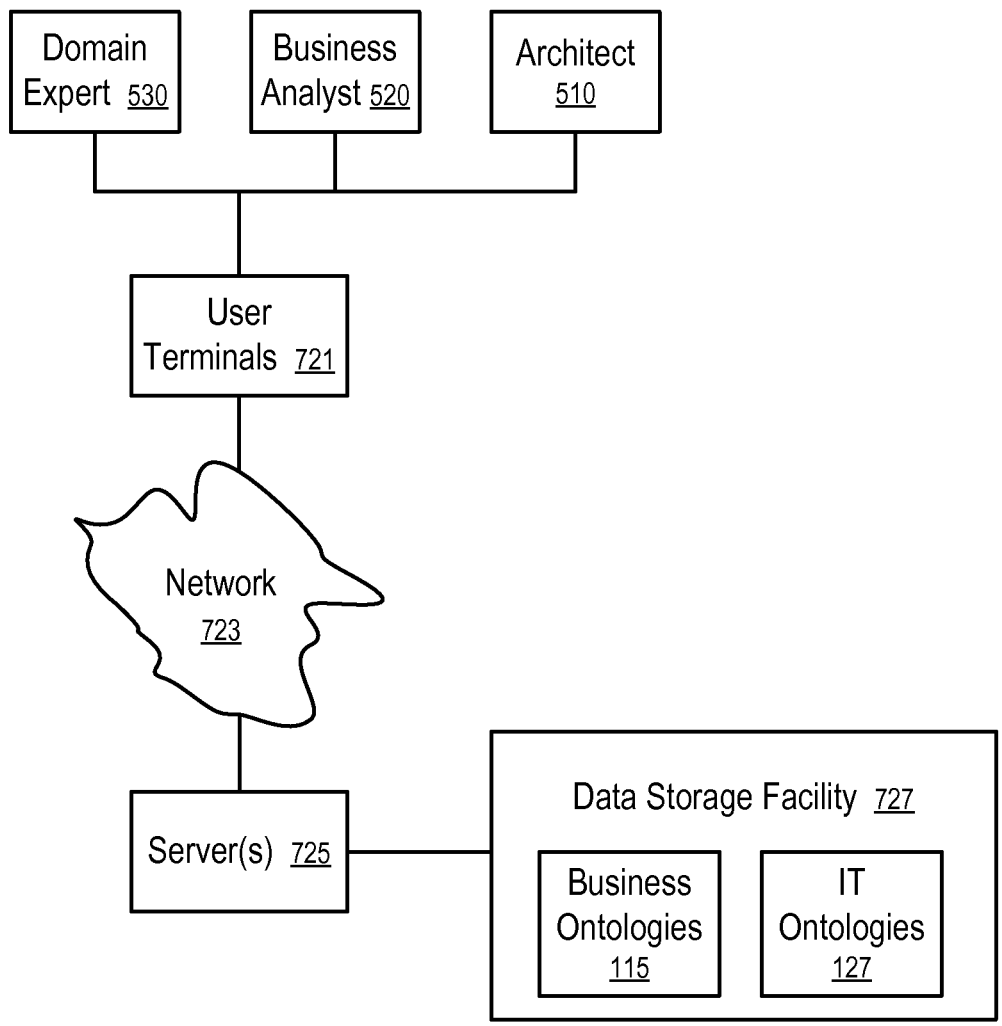
FIG. 8 shows a system to generate a software framework according to one embodiment.

FIG. 8 shows a system to generate a software framework according to one embodiment. In FIG. 8, domain expert 530, business analyst 520, architect 510 use user terminals 721 to access server 725 over network 723. The network 723 may be a local area network, a wireless data communication network, an intranet, or a combination of networks, such as Internet.

In one embodiment, the servers 725 include web servers hosting a semantic Wiki 608. The data storage facility 727 is connected to the servers 725 to store the business ontologies 115 and IT ontologies 127. Through the servers 725, the domain experts 530, business analyst 520, architects 510 can collaborate to build the business ontologies 115, IT ontologies 127, and map between the business ontologies 115 and IT ontologies 127 to generate a software framework.

FIG. 8 illustrates a system in which the business ontologies 115 and IT ontologies 127 are hosted at a centralized location via the servers 725. Alternatively, the business ontologies 115 and IT ontologies 127 can be hosted on a peer to peer network. Thus, the disclosure is not limited to a particular implementation.

Figure 9:
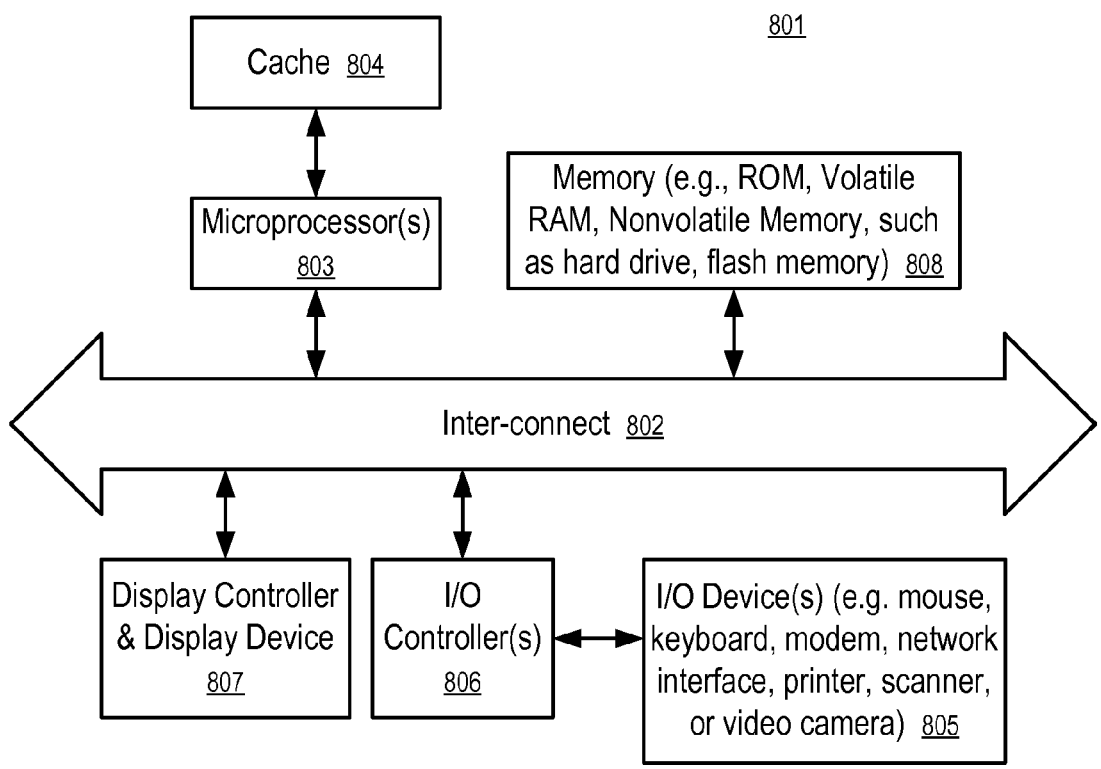
FIG. 9 illustrates a data processing system which can be used in various embodiments.

FIG. 9 illustrates a data processing system which can be used in various embodiments. While FIG. 9 illustrates various components of a computer system, it is not intended to represent any particular architecture or manner of interconnecting the components. Some embodiments may use other systems that have fewer or more components than those shown in FIG. 9.

In one embodiment, a server data processing system illustrated in FIG. 9 implements at least one of the components shown in FIG. 8, such as the web server(s) 725, and/or the storage facility 727. In one embodiment, a user terminal (e.g., 721) is a data processing system as illustrated in FIG. 9.

In FIG. 9, the data processing system 801 includes an inter-connect 802 (e.g., bus and system core logic), which interconnects a microprocessor(s) 803 and memory 808. The microprocessor 803 is coupled to cache memory 804 in the example of FIG. 9.

The inter-connect 802 interconnects the microprocessor(s) 803 and the memory 808 together and also interconnects them to a display controller and display device 807 and to peripheral devices such as input/output (I/O) devices 805 through an input/output controller(s) 806. Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect 802 may include one or more buses connected to one another through various bridges, controllers and/or adapters. In one embodiment the I/O controller 806 includes a USB (Universal Serial Bus) adapter for controlling USB peripherals, and/or an IEEE-1394 bus adapter for controlling IEEE-1394 peripherals.

The memory 808 may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs. The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method implemented in a computer, the method comprising:
   receiving, in the computer, input from one or more first users to generate a first ontology describing a software requirement including requested services;
   storing, in the computer, a second ontology describing software tools providing available services;
   receiving, in the computer, mapping input from one or more second users, the mapping input tying the first ontology describing the requested services to the second ontology describing the software tools providing the available services; and
   generating, by the computer, a software framework based on the mapping input received from the one or more second users, wherein the software framework includes connections between the requested services in the first ontology and the available services provided by the software tools described in the second ontology; performing semantic extraction and mapping to generate articles and a domain ontology for the semantic collaborative web site; and
   storing a third ontology to aid the semantic extraction.

2. The method of claim 1, wherein the software tools comprise existing software tools.

3. The method of claim 1, wherein the first ontology comprises uses cases, processes and rules.

4. The method of claim 3, wherein the second ontology comprises uses cases and rules.

5. The method of claim 1, further comprising:
   receiving input to partition the software tools to generate the second ontology.

6. The method of claim 5, further comprising:
   providing an ontology to assist partitioning of the software tools.

7. The method of claim 1, wherein the software requirement is related to a business; and the software framework includes at least a business object model, a business rules model, or a business process model.

8. The method of claim 1, wherein the input from the one or more first users is received in a semantic collaborative web site.

9. The method of claim 8, wherein the semantic extraction and mapping is performed using an ontology-based information extraction (OBIE) technique.

10. The method of claim 8, wherein the ontology-based information extraction (OBIE) technique is based on information extraction/knowledge mining techniques and technologies.

11. The method of claim 8, further comprising:
    facilitating collaboration via an integrated issue tracking system.

12. The method of claim 8, further comprising:
    facilitating collaboration via an expertise management system to route a document or inquiry.

13. The method of claim 12, wherein the expertise management system comprises semantic rules.

14. The method of claim 12, wherein the expertise management system comprises rules for query, monitoring, expertise mapping, ranking, allocation, or user interaction management.

15. The method of claim 1, further comprising:
    validating the input from the one or more first users via a rule-based reasoner.

16. The method of claim 15, further comprising:
    prompting interactive user involvement to resolve rule violations detected by the rule-based reasoner.

17. A non-transitory machine readable medium embodying instructions, the instructions causing a data processing system to perform a method, the method comprising:
    receiving input from one or more first users to generate a first ontology describing a software requirement including requested services;
    storing, in the computer, a second ontology describing software tools providing available services;
    receiving mapping input from one or more second users, the mapping input tying the first ontology describing the requested services to the second ontology describing the software tools providing the available services; and
    generating a software framework in the data processing system based on the mapping input received from the one or more second users, wherein the software framework includes connections between the requested services in the first ontology and the available services provided by the software tools described in the second ontology; performing semantic extraction and mapping to generate articles and a domain ontology for the semantic collaborative web site; and
    storing a third ontology to aid the semantic extraction.

18. A data processing system, comprising:
    a processor; and
    a memory coupled with the processor and storing instructions configured to instruct the processor to:
    receive input from one or more first users to generate a first ontology describing a software requirement including requested services;
    store a second ontology describing software tools providing available services;
    receive mapping input from one or more second users, the mapping input tying the first ontology describing the requested services to the second ontology describing the software tools providing the available services; and
    generate a software framework in the data processing system based on the mapping input received from the one or more second users, wherein the software framework includes connections between the requested services in the first ontology and the available services provided by the software tools described in the second ontology; performing semantic extraction and mapping to generate articles and a domain ontology for the semantic collaborative web site; and
    storing a third ontology to aid the semantic extraction.

* * * * *